United States Patent
Katayama et al.

(10) Patent No.: US 9,837,645 B2
(45) Date of Patent: Dec. 5, 2017

(54) ONBOARD BATTERY

(71) Applicant: TOYOTA JIDOSHA KABUSHIKI KAISHA, Toyota-shi, Aichi-ken (JP)

(72) Inventors: Yusuke Katayama, Nagoya (JP); Koichi Nagamine, Toyota (JP); Naoki Fukusako, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/047,925

(22) Filed: Feb. 19, 2016

(65) Prior Publication Data
US 2016/0248059 A1 Aug. 25, 2016

(30) Foreign Application Priority Data

Feb. 20, 2015 (JP) .................................. 2015-032023

(51) Int. Cl.
*H01M 2/10* (2006.01)
*B60K 1/04* (2006.01)
*B60R 16/02* (2006.01)
*H01M 10/625* (2014.01)

(52) U.S. Cl.
CPC ............. *H01M 2/1083* (2013.01); *B60K 1/04* (2013.01); *B60R 16/0215* (2013.01); *B60K 2001/0416* (2013.01); *B60Y 2306/01* (2013.01); *H01M 10/625* (2015.04); *H01M 2220/20* (2013.01)

(58) Field of Classification Search
CPC .... B60K 2001/0405; B60K 2001/0416; B60K 2001/0433; B60K 2001/0477; B60R 16/0215; H01M 2/1083
See application file for complete search history.

(56) References Cited

U.S. PATENT DOCUMENTS 6,662,891 B2 * 12/2003 Misu .................... B60K 1/04
                                                  180/65.1
8,302,712 B2 * 11/2012 Aoto .................... B60K 1/04
                                                  180/65.1
2008/0274397 A1 * 11/2008 Watanabe ............ B60K 1/04
                                                   429/99

(Continued)

FOREIGN PATENT DOCUMENTS

JP            2013-008524 A       1/2013
JP            2013-026111 A       2/2013
KR     10-2013-0140574 A       12/2013

*Primary Examiner* — Frank Vanaman
(74) *Attorney, Agent, or Firm* — Sughrue Mion, PLLC

(57) ABSTRACT

An onboard battery mounted in a front section of a space located behind a rearmost seat of an automobile includes: an assembly battery including electrode terminals arranged on a rear surface of the assembly battery in a vehicle frontward and rearward direction; and a battery case housing the assembly battery. A case rear-surface member forming a rear surface of the battery case is provided with a ridge portion that faces at least a part of a rear surface of the assembly battery in the vehicle frontward and rearward direction in a manner so as to avoid the electrode terminals, the ridge portion projecting toward the assembly battery. When the case rear-surface member moves toward the assembly battery, the ridge portion comes into contact with the assembly battery before the case rear-surface member applies force to the electrode terminals.

11 Claims, 4 Drawing Sheets

(56) References Cited

U.S. PATENT DOCUMENTS

| | | | |
|---|---|---|---|
| 2011/0293973 A1* | 12/2011 | Kim | H01M 2/04 |
| | | | 429/53 |
| 2012/0251862 A1* | 10/2012 | Kano | B60K 1/04 |
| | | | 429/99 |
| 2013/0037338 A1* | 2/2013 | Harunari | B60K 1/04 |
| | | | 180/68.5 |
| 2013/0075155 A1* | 3/2013 | Kawai | B60R 16/0215 |
| | | | 174/70 C |
| 2013/0333967 A1 | 12/2013 | Meier | |
| 2014/0242447 A1* | 8/2014 | Nomura | B60L 11/005 |
| | | | 429/163 |

\* cited by examiner

F I G . 3
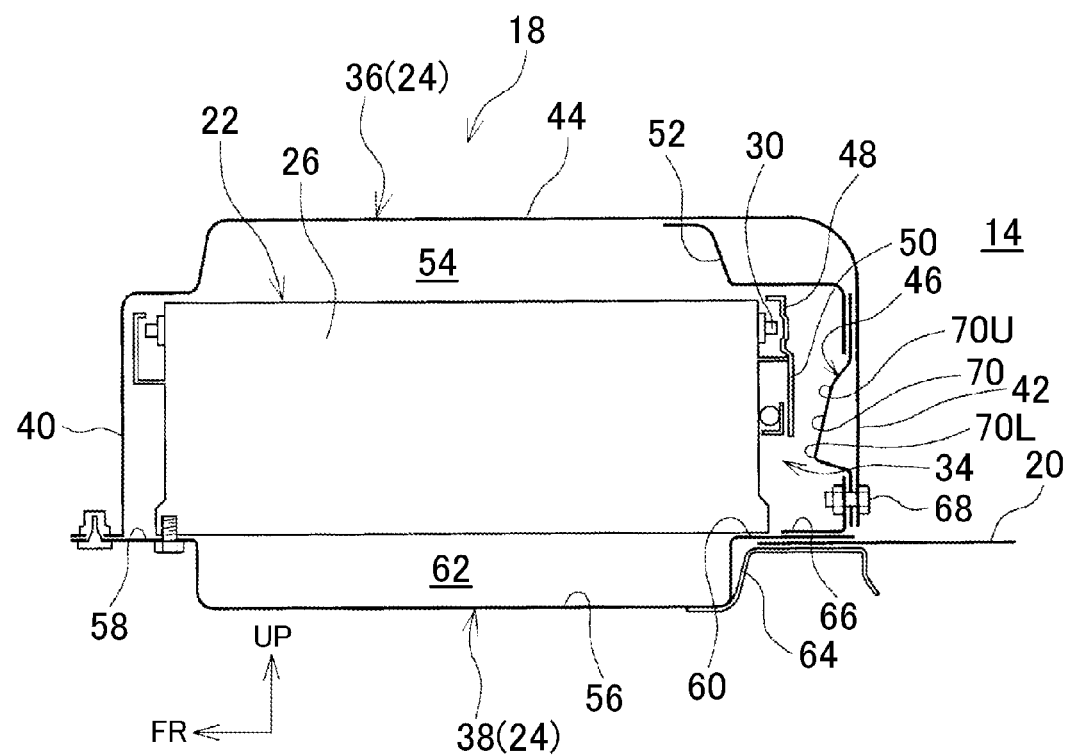

ONBOARD BATTERY

INCORPORATION BY REFERENCE

The disclosure of Japanese Patent Application No. 2015-032023, filed on Feb. 20, 2015, including the specification, drawings and abstract, is incorporated herein by reference in its entirety.

BACKGROUND

1. Field

The present disclosure relates to an onboard battery mounted in an automobile, and particularly, to protection of an onboard battery during a collision of an automobile.

2. Description of Related Art

In some automobiles, such as hybrid vehicles, equipped with electric motors, batteries may be used to supply electric power to electric motors. These batteries may be mounted within the vehicle. For example, these batteries may be mounted in the trunk of the vehicle. If these automobiles are suddenly decelerated, for example, during a collision, objects in the trunk might collide with the batteries mounted therein.

Japanese Patent Application Publication No. 2013-8524 discloses a technique that provides a battery with a protector to prevent a floor of an automobile, deformed by a collision, from applying force to electrode terminals of a battery through a case. The protector is formed so as to project further outward than the electrode terminals, thereby preventing the floor and the case from reaching the electrode terminals. The protector is fixed to an end plate stacked together with battery cells, and to a resin frame.

Japanese Patent Application Publication No. 2013-26111 discloses a technique that provides a pack case accommodating a battery group with stepped portions configured to be deformable so as to absorb an impact. If an upper case of the pack case is deformed and comes into contact with the electrode terminals, the stepped portions, which correspond to portions of the upper case that come into contact with positive electrode terminals, become deformed to absorb impact.

In JP 2013-8524 A, a resin frame disposed between every adjacent battery cell is used for the purpose of providing a protector to the battery. Consequently, a dimension of the battery in the stacking direction becomes increased by the thickness of the resin frames.

SUMMARY

The present disclosure provides an onboard battery capable of suppressing an increase in dimension of the battery, and suppressing a force to be applied to electrode terminals from a projectile or the like.

An aspect of the present disclosure relates to an onboard battery mounted in an automobile. The onboard battery is mounted in a front section of a trunk located behind a rearmost seat of the automobile. The onboard battery includes an assembly battery and a battery case housing the assembly battery. Electrode terminals of the assembly battery are arranged on a rear surface of the assembly battery. The battery case includes a case rear-surface member forming a rear surface of the battery case, and is provided with a ridge portion that faces at least a part of the rear surface of the assembly battery in the frontward and rearward direction, and that rises toward the assembly battery. The ridge portion faces the rear surface of the assembly battery in a manner so as to avoid the electrode terminals. When the case rear-surface member moves toward the assembly battery, the ridge portion comes into contact with the assembly battery before the case rear-surface member applies force to the electrode terminals.

The ridge portion may face the rear surface of the assembly battery with a distance therebetween, and the case rear-surface member may be fixed at a lower edge of the case rear-surface member to a vehicle body.

By providing the ridge portion in a manner so as to avoid the electrode terminals, it is possible to suppress contact of the battery case with the electrodes. The case rear-surface member is fixed at the lower edge thereof to the vehicle body with a distance between the ridge portion and the rear surface of the assembly battery, thereby bringing the case rear-surface member to be forwardly inclined at the moment when a loaded object in the trunk collides against the case rear-surface member. The loaded object in the trunk moves along the case rear-surface member forwardly inclined, thereby reducing impact to be received by the assembly battery.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a drawing showing a sectional view of the onboard battery; and

DETAILED DESCRIPTION OF EMBODIMENTS

Figure 1:
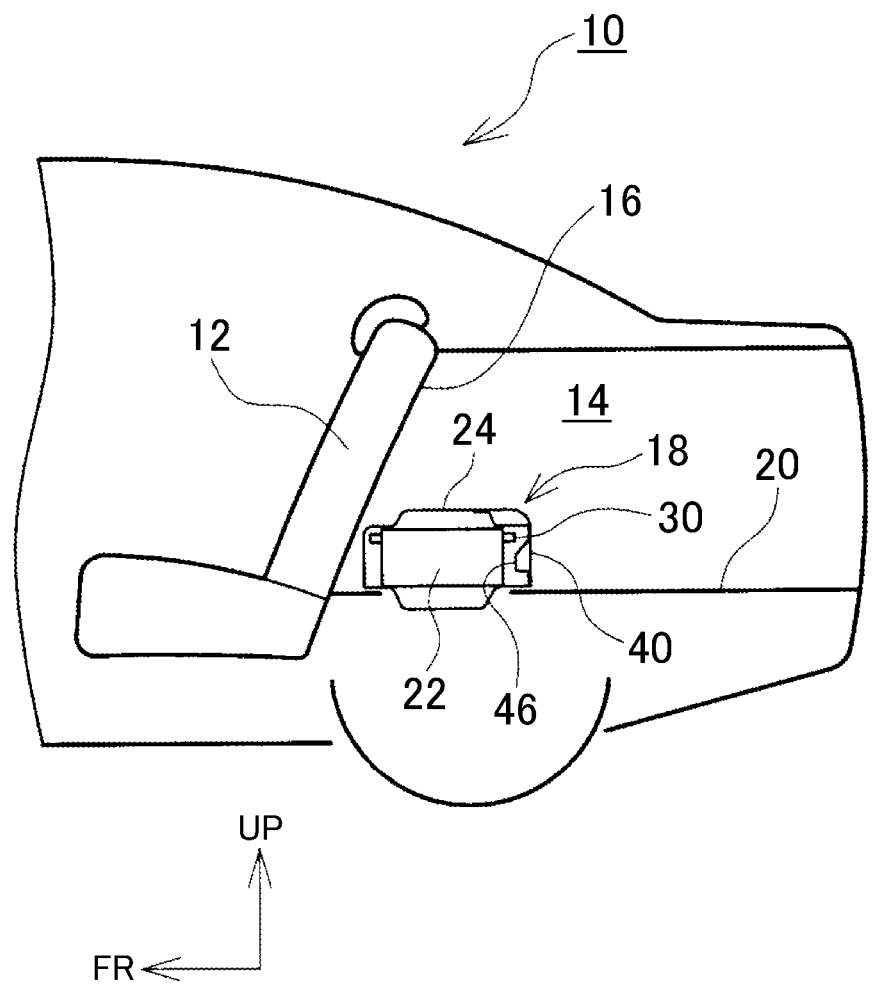
FIG. 1 is a side sectional view showing a main part of a rear section of an automobile.

Embodiments of the present disclosure will be described with reference to drawings hereinafter. FIG. 1 is a side sectional view of a rear section of an automobile 10 equipped with an electric motor (not shown), such as a hybrid vehicle, and showing a main part of the automobile 10. In FIG. 1, a direction indicated by an arrow FR represents a frontward direction of the automobile 10, and a direction indicated by an arrow UP represents an upward direction thereof. In the following drawings, the frontward direction and the upward direction of the automobile are indicated by using the arrows FR and UP respectively. In the following description, terms expressing directions and orientations, such as frontward, rearward, right, left, upward, downward, and sideward, denote directions and orientations with reference to the automobile 10 otherwise mentioned.

In the present embodiment, the automobile 10 is a passenger vehicle including front seats (not shown) and rear seats 12. The automobile 10 further includes a trunk 14 behind the rear seats 12. A back face 16 of the rear seats 12 defines a front end of the trunk 14. Although in the present embodiment, the automobile 10 includes front seats and rear seats 12, and a space behind the rear seats 12 is treated as the trunk 14, in some embodiments, the automobile 10 may include only front seats, in which case the front seats are equivalent to the rear seats 12, and thus a space behind the front seats may be treated as the trunk 14. A battery 18 is installed in a front section of the trunk 14. The battery 18 is referred to as an "onboard battery 18" hereinafter. A partition wall (not shown) may be provided in the trunk 14 between a space where the onboard battery 18 is installed and a space where other objects, such as luggage, may be loaded in the trunk 14, in order to separate these spaces. In the present embodiment, the onboard battery 18 is installed immediately behind the rear seats 12, and as shown in FIG. 1, the onboard battery 18 is placed on a floor surface 20 of the trunk 14 (hereinafter, referred to as a "trunk floor surface 20"). Also in the present embodiment, the installation position of the onboard battery 18 corresponds to a position between wheel houses of right and left rear wheels. The onboard battery 18 includes an assembly battery 22, and a battery case 24 in which the assembly battery 22 is housed. In the present embodiment, electric power is supplied from the onboard battery 18 to an electric motor (not shown) for driving the automobile 10. Additionally or alternatively, the onboard battery 18 may supply electric power to other portions, processes, or devices of the automobile 10. The onboard battery 18 may be charged with electric power generated through regenerative processes, such as braking or the like. Additionally or alternatively, the onboard battery 18 may be charged by an external power source (not shown).

Figure 2:
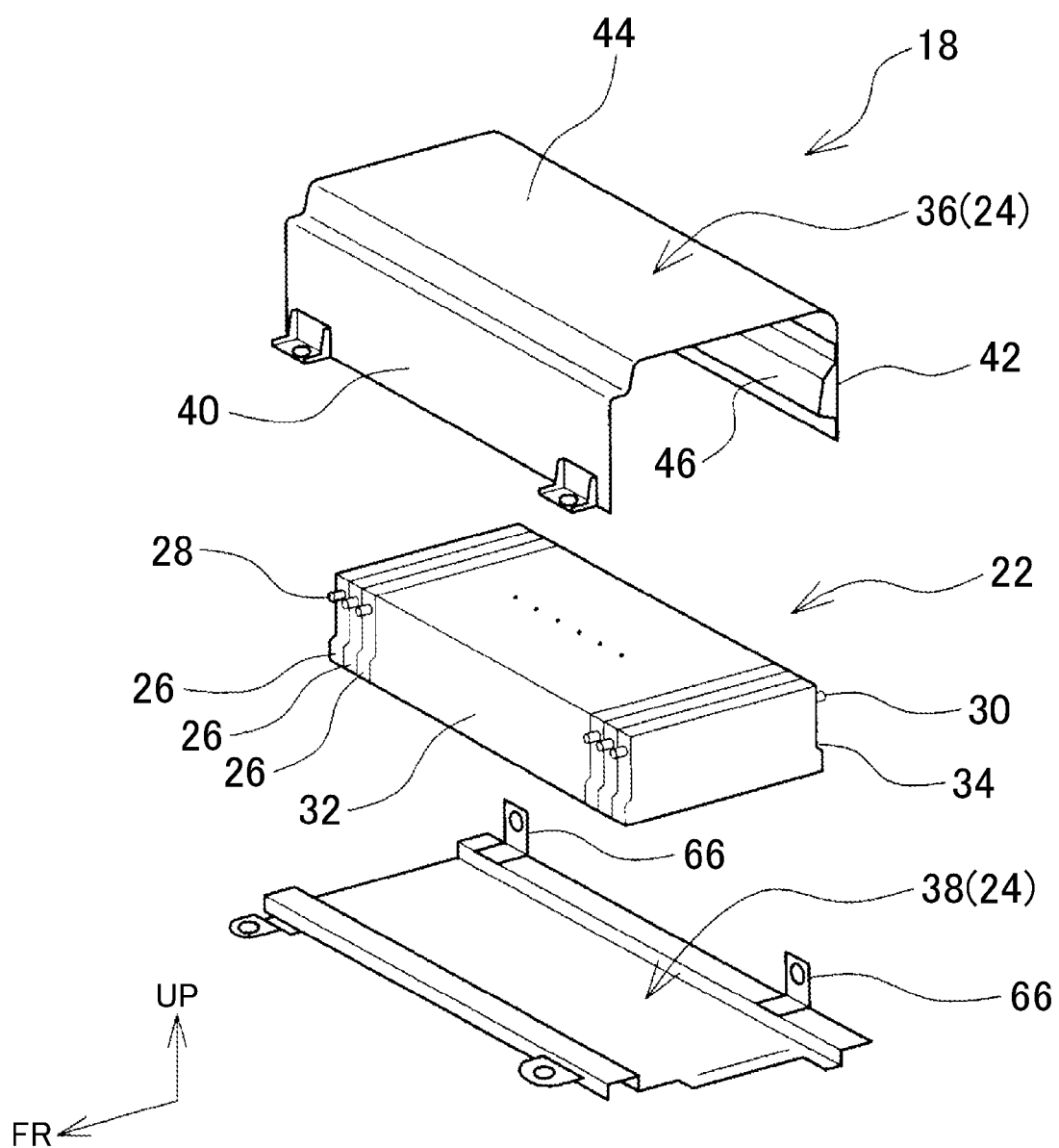
FIG. 2 is a perspective view showing an onboard battery, particularly an assembly battery and a battery case.

FIG. 2 is an exploded perspective view showing an exemplary configuration of the onboard battery 18. The assembly battery 22 is formed by stacking battery modules 26, each having a generally rectangular shape with a thickness, in a thickness direction of the battery modules 26. In the present embodiment, the onboard battery 18 is oriented such that a stacking direction of the battery modules 26 coincides with a right and left direction, perpendicular to the frontward direction FR, when the onboard battery 18 is installed in the automobile 10. Each battery module 26 includes a plurality of cells, for example, six cells connected in series, and has a generally rectangular shape with a thickness. A positive electrode and a negative electrode, and an electrolytic solution are included in each battery module 26. A pair of electrode terminals 28, 30 are disposed so as to project from opposing side surfaces of each battery module 26. In the present embodiment, the onboard battery 18 is oriented such that each electrode terminal 28 projects frontward relative to the automobile 10, and each electrode terminal 30 projects rearward relative to the automobile 10. Each of the electrode terminals 28 and each of the electrode terminals 30 are connected to respective electrodes of each cell connected in series in the battery module 26. The assembly battery 22 has a generally rectangular-parallelepiped shape. A surface facing frontward relative to the automobile 10 of this generally rectangular-parallelepiped shape is referred to as a "front surface 32," and a surface facing rearward relative to the automobile 10 thereof is referred to as a "rear surface 34." The front surface 32 and the rear surface 34 are substantially perpendicular surfaces. The electrode terminals 28 are arranged along an upper edge of the front surface 32, and the electrode terminals 30 are arranged along an upper edge of the rear surface 34.

The battery case 24, in which the assembly battery 22 is housed, includes an upper case 36 and a lower case 38. In the present embodiment, the upper case 36 is integrally formed of a steel plate, and includes a case front-surface member 40, a case rear-surface member 42, and a case upper-surface member 44. The case front-surface member 40 and the case rear-surface member 42 are arranged substantially perpendicular relative to the case upper-surface member 44. When assembled, the upper case 36 is oriented relative to the assembly battery 22 such that the case front-surface member 40 faces the front surface 32 of the assembly battery 22, such that the case rear-surface member 42 faces the rear surface 34 of the assembly battery 22, and such that the case upper-surface member 44 faces an upper surface of the assembly battery 22. When assembled, the lower case 38 is oriented such that the lower case 38 faces a lower surface of the assembly battery 22. When assembled, the upper case 36 and the lower case 38 form a tube-like structure having a generally rectangular-hollow section. Both ends of this tube-like structure (the upper case 36 and the lower case 38) are closed by capping members (not shown). From the discussion above, it should therefore be appreciated that the battery case 24, when assembled, is formed by the capping members disposed at both ends of the tube-like structure (the upper case 36 and the lower case 38). A ridge portion 46 projects from an inner side of the case rear-surface member 42, that is, the ridge portion 46 projects from a surface of the case rear-surface member 42 that faces the rear surface 34 of the assembly battery 22. The ridge portion 46 is formed and/or disposed in a manner so as to avoid contact with the electrode terminals 30. For example, in the present embodiment, the ridge portion 46 projects from the inner surface of the case rear-surface member 42 below the electrode terminals 30 when the battery case 24 is assembled. The ridge portion 46 may be formed such that, when the battery case 24 is assembled, the ridge portion 46 is located and extends, in the right and left direction, along a length that corresponds substantially to the location and length of the electrode terminals 30. The ridge portion 46 may extend continuously along this length in the right and left direction or the ridge portion 46 may be formed and/or disposed at intervals along this length in the right and left direction. For example, the ridge portion 46 may be formed and/or disposed at intervals in between consecutive electrode terminals 30.

FIG. 3 is a detailed-longitudinal sectional view of the onboard battery 18. The assembly battery 22 includes a terminal cover 48 and a wire harness holder 50 that extend in the right and left direction along the rear surface 34 of the assembly battery 22. The terminal cover 48 and the wire harness holder 50 may be disposed across the entire length of the rear surface 34 in right and left direction. The terminal cover 48 covers a back side of each electrode terminal 30. The wire harness holder 50 defines a space between the wire harness holder 50 and the battery module 26 (or when assembled, the assembly battery 22). A wire harness (not shown), configured to transmit signals to various sensors, is disposed in this space. The terminal cover 48 and the wire harness holder 50 may be formed as an integral resin component. The terminal cover 48 and the wire harness holder 50 may be attached directly to the battery modules 26 (or when assembled, the assembly battery 22).

An air guiding plate 52 is fixed to the case rear-surface member 42 and the case upper-surface member 44 adjacent to a corner portion of the upper case 36 defined by the case rear-surface member 42 and the case upper-surface member 44. The air guiding plate 52 may be fixed thereto by welding or the like. An upper surface of the upper case 36, formed by the air guiding plate 52 and the case upper-surface member 44, has a generally protruding shape. When the battery case 24 is assembled, a projecting portion of the generally protruding shape of the upper surface of the upper case 36, is disposed adjacent to an upper surface of the assembly battery 22. Further, an upper air guiding passage 54 is formed between the upper surface of the upper case 36 (including the projecting portion) and the assembly battery 22. Air is configured to pass through the upper air guiding passage 54 in the right and left direction (i.e., in a direction which penetrates the drawing of FIG. 3) so as to cool the assembly battery 22. The air guiding plate 52 restricts the upper air guiding passage 54 so as to restrict a region through which air flow passes adjacent to the upper surface of the assembly battery 22. The lower case 38 includes a recessed portion formed adjacent to a lower surface of the assembly battery 22 when the battery case 24 is assembled. A gap exists between a bottom surface 56 of the recessed portion of the lower case 38 and a lower surface of the assembly battery 22. A front edge and a rear edge of the lower surface of the assembly battery 22 are supported by edge portions 58, 60 of the recessed portion, respectively, and are fixed thereto with bolts or the like. The recessed portion of the lower case 38 defines a lower air guiding passage 62 between the recessed portion of the lower case 38 and the lower surface of the assembly battery 22. Air is configured to pass through the lower air guiding passage 62 in the right and left direction (i.e., in a direction which penetrates the drawing of FIG. 3) so as to cool the assembly battery 22.

The lower case 38 is fixed to the automobile 10 through welding or the like. FIG. 3 illustrates that the lower case 38 is fixed at the edge portion 60 to a cross member 64 of the body of the automobile 10. The lower case 38 is further fixed to the body of the automobile 10 at other locations (not shown). A height of the upper surface of the cross member 64 substantially coincides with a height of the trunk floor surface 20. Hence, a height of the edge portion 60 of the lower case 38, that is, a height of the lower surface of the assembly battery 22 is substantially the same as a level of the trunk floor surface 20.

The upper case 36 and the lower case 38 are joined to each other at front edges and rear edges thereof. At the rear edges, a lower edge of the case rear-surface member 42 is joined to a plurality of L-shaped brackets 66 welded to the edge portion 60 of the lower case 38 with bolts 68. In some embodiments, the L-shaped brackets 66 may be integrated with the lower case 38 using a single steel plate. Further, in some embodiments, the plurality of L-shaped brackets 66 may be replaced by a single elongated L-shaped bracket 66. From the discussion above, it should therefore be appreciated, that the case rear-surface member 42 is fixed at the lower edge thereof to the body of the automobile 10 through the lower case 38 and the brackets 66. In some embodiments, the case rear-surface member 42 may be fixed at the lower edge thereof directly to the body of the automobile 10. In still other embodiments, the case rear-surface member 42 may be fixed through brackets, or the like, directly to the body of the automobile 10. In the present embodiment, the lower edge of the case rear-surface member 42 is located at substantially the same level as that of the trunk floor surface 20. It should be appreciated that in some embodiments, however, the lower edge of the case rear-surface member 42 and the trunk floor surface 20 may be vertically offset from one another. For example, the trunk floor surface 20 may be located at a higher or lower height than the lower edge of the case rear-surface member 42.

The ridge portion 46 is fixed to the case rear-surface member 42 through welding or the like. The ridge portion 46 includes an upwardly and rearwardly sloped surface 70 that faces the rear surface 34 of the assembly battery 22. The sloped surface 70 is hereinafter referred to as a "slope surface 70." The slope surface 70 is offset from the rear surface 34 of the assembly battery 22. Further, a lower edge 70L of the slope surface 70 is offset in the frontward direction FR from an upper edge 70U thereof such that the lower edge 70L is located closer to the rear surface 34 of the assembly battery 22 than the upper edge 70U. In the present embodiment, the plate member constituting the ridge portion 46 is fixed together with the plate member forming the case rear-surface member 42 to the L-shaped brackets 66 with the bolts 68.

Figure 4:
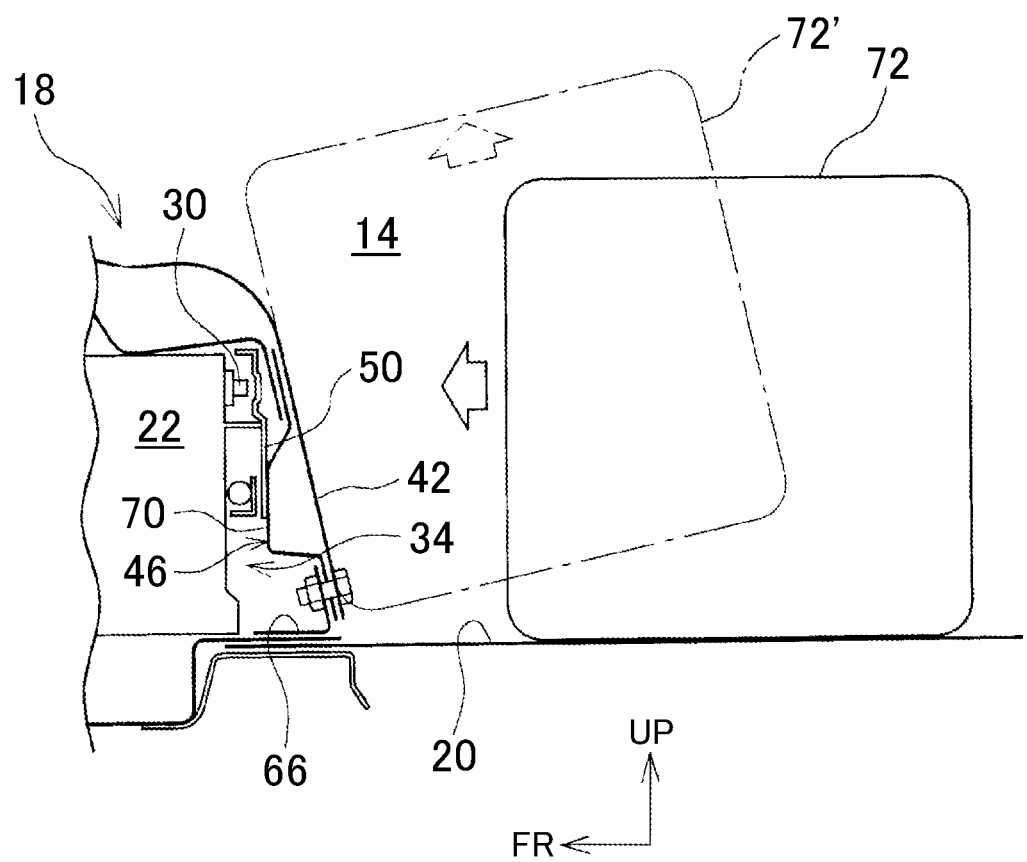
FIG. 4 is a sectional view showing a state in which a loaded object in a trunk collides against the onboard battery.

FIG. 4 is a drawing showing a state when a loaded object 72 in the trunk 14 collides against the onboard battery 18. If the automobile 10 is suddenly decelerated because of a forward collision or the like, the loaded object 72 in the trunk 14 moves forwardly due to inertia, and collides against the case rear-surface member 42 of the onboard battery 18. In some such collisions, if the force applied to the case rear-surface member 42 by the loaded object 72 is great, the case rear-surface member 42 may deform in the frontward direction. From the discussion above, it should be appreciated that the case rear-surface member 42 is fixed at the lower edge thereof, but is not constrained at the upper edge thereof, and further that a gap exists between the ridge portion 46 and the assembly battery 22; thus, it should be appreciated that the case rear-surface member 42 is free to rotatably deform about the lower edge thereof. As shown in FIG. 4, if the case rear-surface member 42 rotatably deforms in a frontward direction, the ridge portion 46 comes into contact with the rear surface 34 of the assembly battery 22. In particular, the ridge portion 46 comes into contact with the wire harness holder 50 in the present embodiment. As a result of this contact, further deformation of the case rear-surface member 42 is prevented so as to prevent contact with, or the application of force to, the electrode terminals 30 thereby protecting the electrode terminals 30 and the assembly battery 22 more generally. Further, the surface of the wire harness holder 50 and the slope surface 70 of the ridge portion 46 become substantially parallel with each other such that the surface of the wire harness holder 50 and the slope surface 70 of the ridge portion 46 contact one another over a substantial surface area as shown in FIG. 4 thereby preventing concentrated contact points between the two surfaces. As such, a force applied to the wire harness holder 50 is spread across a substantial surface area thereby preventing concentrations of force.

If the case rear-surface member 42 rotatably deforms in a frontward direction, the case rear-surface member 42 of the battery case 24 becomes upwardly and frontwardly inclined. When the ridge portion 46 comes into contact with the rear surface 34 of the assembly battery 22 as discussed above, an angle of inclination of the case rear-surface member 42 is between 10° and 20°, and more particularly between 10° and 15° relative to the upward direction UP. An angle of upward and rearward inclination of the slope surface 70 of the ridge portion 46 in a normal state (FIG. 3) corresponds to this angle (i.e., an angle of inclination of the slope surface 70 is between 10° and 20°, and more particularly between 10° and 15° relative to the upward direction UP). When the case rear-surface member 42 rotatably deforms frontwardly, the loaded object 72, having collided with the case rear-surface member 42, moves upwardly and frontwardly along a rear surface of the case rear-surface member 42 as illustrated by a loaded object 72' indicated by a dashed line. Accordingly, a portion of the force of the loaded object 72 is directed away from the onboard battery 18, thus reducing a force applied to the onboard battery 18.

Each electrode terminal 30 extends inside of each battery module 26; therefore, if a great force is applied to the electrode terminal 30, this force is transferred to the inside of the battery module 26, which may cause damage to the battery module 26. To counter this, each battery module 26 is made relatively rigid, and the wire harness holder 50 is configured such that any force applied thereto is imparted upon each battery module 26 at locations other than the electrode terminal 30, thereby preventing the battery module 26 from being damaged. In the onboard battery 18, the ridge portion 46 is brought into contact with the wire harness holder 50, thereby distributing the force to be transferred to the battery modules 26 as discussed above. It should be appreciated that the loaded object 72 does not always uniformly collide against an entire length of the case rear-surface member 42 of the battery case 24 in the right and left direction. If the loaded object 72 collides against only a portion of the case rear-surface member 42 of the battery case 24, only the ridge portion 46 located in the vicinity of this portion comes into contact with the wire harness holder 50. Since the wire harness holder 50 extends in the right and left direction, the wire harness holder 50 transfers the force received from the ridge portion 46 in the right and left direction, thereby transferring this force to as many battery modules 26 as possible. In this manner, the force imposed upon any single battery module 26 is reduced. It should therefore be appreciated that by providing the assembly battery 22 with an elongate member, such as the terminal cover 48 and the wire harness holder 50 of the present embodiment, which extends along the length of the assembly battery 22 in the right and left direction, and receives the force from the ridge portion 46, it is possible to distribute the force from the loaded object 72 to as many battery modules 26 as possible.

Another embodiment according to the present invention disclosure will be described. An onboard battery according to another embodiment includes an assembly battery and a battery case accommodating the assembly battery. The battery case includes a surface member forming a surface that faces a terminal arrangement surface where electrode terminals of the assembly battery are arranged. This surface member includes a ridge portion rising toward the assembly battery. The ridge portion faces at least a part of the terminal arrangement surface in a manner as to avoid the electrode terminals. At the moment when the surface member including the ridge portion moves toward the assembly battery, the ridge portion comes into contact with the assembly battery before the surface member applies force to the electrode terminals.

What is claimed is:

1. An onboard battery, wherein the onboard battery is installed in a space located behind a rearmost seat of an automobile, wherein the onboard battery comprises:
    an assembly battery, wherein the assembly battery comprises electrode terminals arranged on a rear surface of the assembly battery; and
    a battery case, wherein the battery case is configured to house the assembly battery,
    wherein the battery case includes a case rear-surface member forming a rear surface of the battery case, the case rear-surface member disposed in parallel with the rear surface of the assembly battery, and the case rear-surface member having a lower edge configured to be fixed to a vehicle body,
    wherein a ridge portion projects from the case rear-surface member toward the battery assembly, so as to face a portion of a rear surface of the assembly battery that is below a position of the electrode terminals, wherein a gap is formed between the ridge portion and the portion of the rear surface of the assembly battery,
    wherein, upon receiving a force, the case rear-surface member is configured to move toward the rear surface of the assembly battery so that the ridge portion comes into contact with the assembly battery before the case rear-surface member applies force to the electrode terminals.

2. The onboard battery according to claim 1, wherein
    the ridge portion includes a slope surface tilting relative to the rear surface of the assembly battery, and
    when the slope surface comes into contact with the assembly battery, the slope surface becomes parallel with a surface of the assembly battery in contact with the slope surface.

3. The onboard battery according to claim 1, wherein
    when the case rear-surface member moves toward the assembly battery the rear surface of the case rear-surface member is configured to direct a projectile away from the assembly battery.

4. The onboard battery according to claim 1, wherein
    the assembly battery comprises an elongate member at least a portion of which covers the electrode terminals of the assembly battery.

5. The onboard battery according to claim 4, wherein
    the elongate member comprises a terminal cover and a wire harness holder, wherein the terminal cover covers the electrode terminals of the assembly battery, wherein the wire harness holder covers a wire harness.

6. The onboard battery according to claim 4, wherein
    wherein when the case rear-surface member moves toward the assembly battery, the ridge portion comes into contact with the elongate member before the case rear-surface member applies force to the electrode terminals.

7. An onboard battery installed within a vehicle, wherein the onboard battery comprises:
    an assembly battery, wherein the assembly battery comprises electrode terminals arranged on a surface of the assembly battery, wherein the assembly battery comprises an elongate member at least a portion of which covers the electrode terminals; and
    a battery case, wherein the battery case is configured to house the assembly battery, wherein the battery case comprises a case rear-surface member forming a rear surface of the battery case, the case rear-surface member disposed in parallel with the rear surface of the assembly battery, and the case rear-surface member having a lower edge configured to be fixed to a vehicle body,
    wherein a ridge portion projects from the case rear-surface member toward the battery assembly, so as to face a portion of the rear surface of the assembly battery that is below a position of the electrode terminals, wherein a gap is formed between the ridge portion and the portion of the rear surface of the assembly battery, wherein the ridge portion comprises a sloped surface,
    wherein, upon receiving a force, the case rear-surface member is configured to move toward the assembly battery, so that the sloped surface of the ridge portion comes into contact with the elongate member of the assembly battery before the case rear-surface member applies force to the electrode terminals.

8. The onboard battery according to claim 7, wherein
    an angle of inclination of the sloped surface is between 10° and 20° relative to a rear surface of the elongate member of the assembly battery.

9. The onboard battery according to claim 7, wherein when the sloped surface comes into contact with the elongate member of the assembly battery, the sloped surface becomes parallel with a rear surface of the elongate member.

10. The onboard battery according to claim 7, wherein a gap exists between the sloped surface and a rear surface of the elongate member of the assembly battery.

11. The onboard battery according to claim 7, wherein the elongate member comprises a terminal cover and a wire harness holder.

* * * * *